United States Patent Office 2,880,461
Patented Apr. 7, 1959

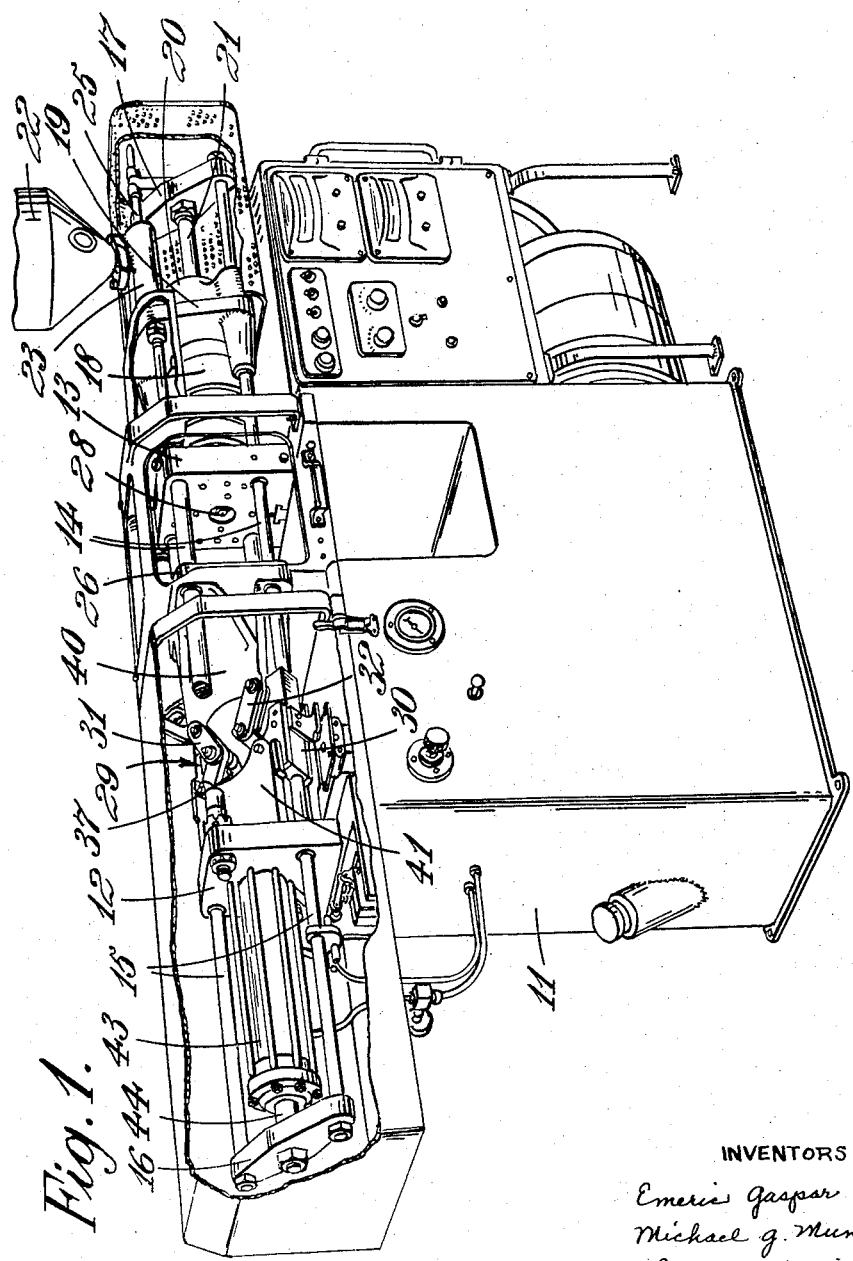

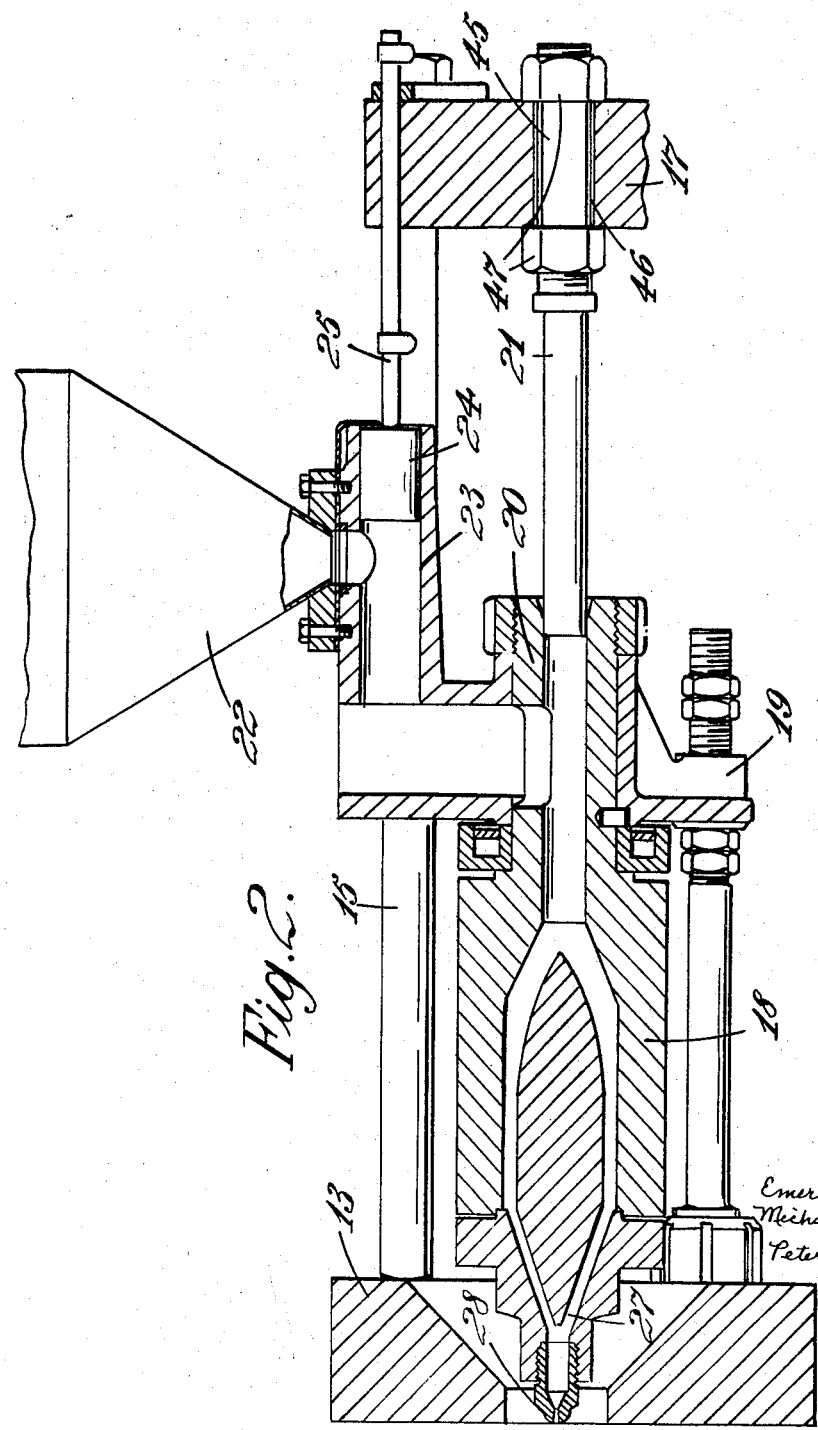

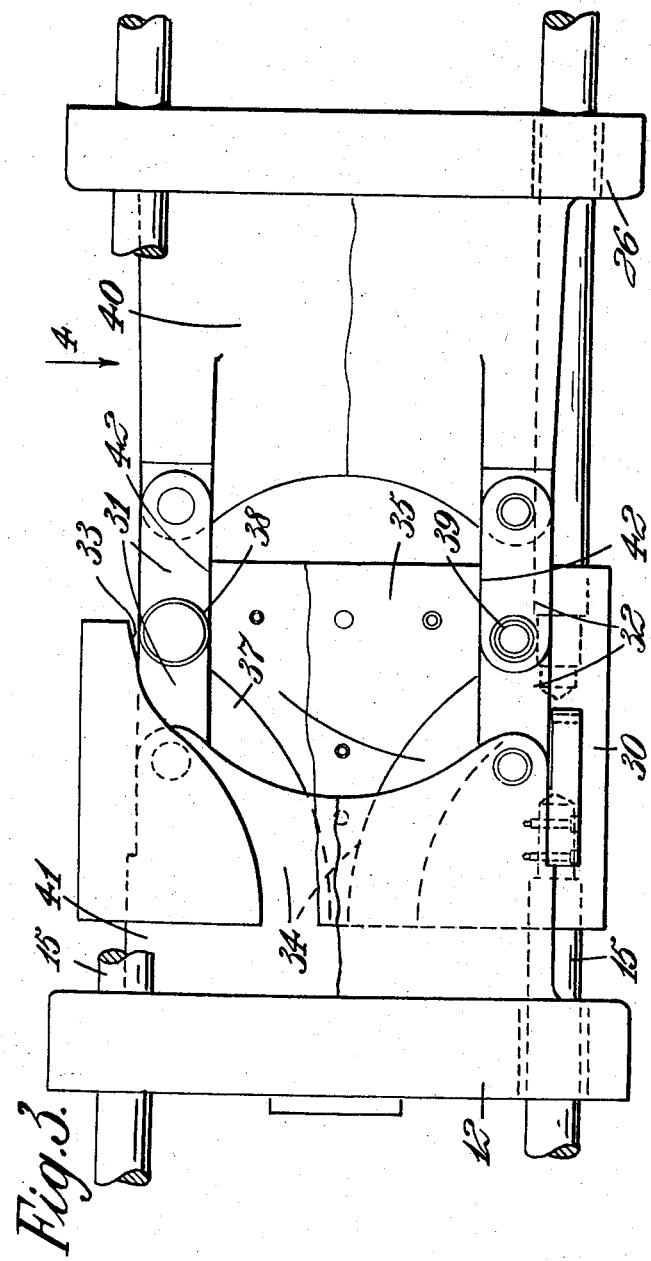

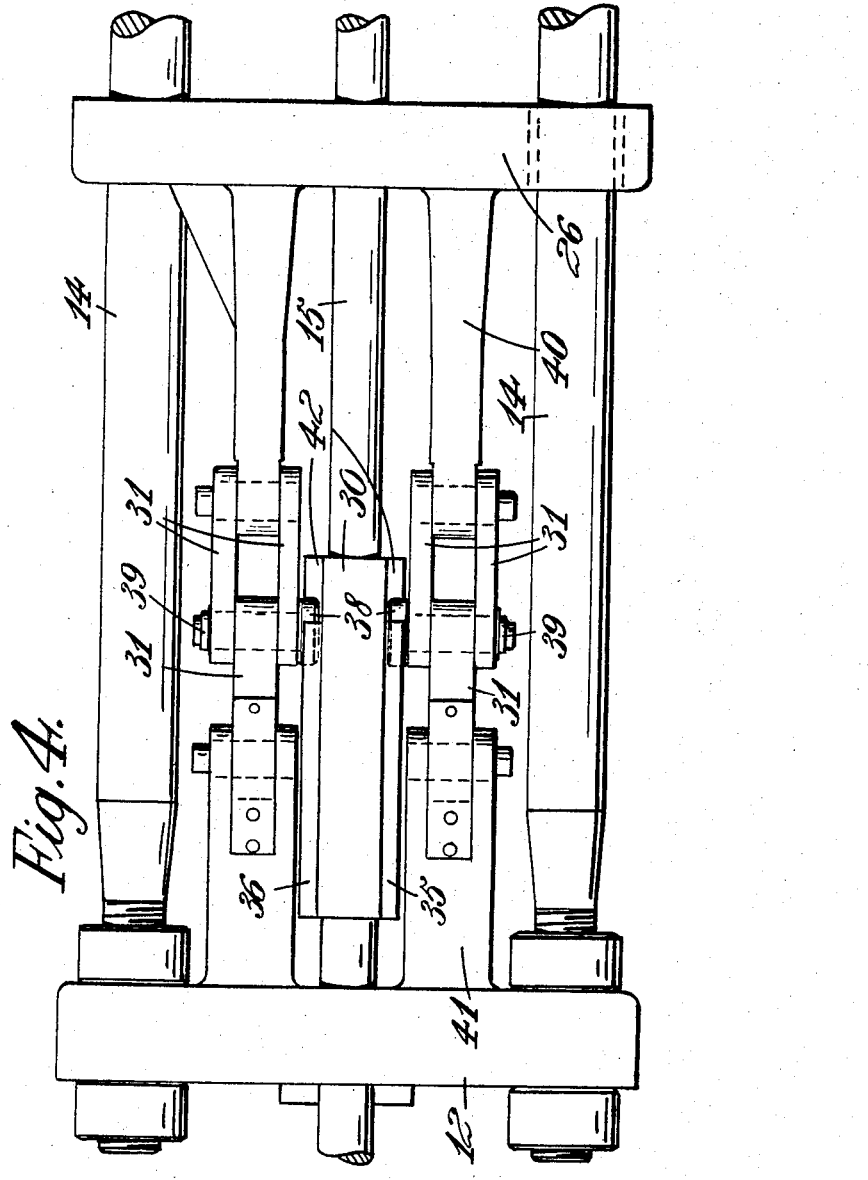

2,880,461
LOCKING AND INJECTION ACTUATING DEVICE FOR INJECTION MOULDING MACHINES

Emeric Gaspar, Michael George Munns, and Peter Franklin Harrison, London, England, assignors to The Projectile & Engineering Company Limited, London, England, a British company Application June 28, 1957, Serial No. 668,686

Claims priority, application Great Britain June 28, 1956

11 Claims. (Cl. 18—30)

This invention relates to injection moulding machines, and is concerned with machines of the kind in which a single fluid-operated piston-and-cylinder unit is employed for both closing the mould and providing the injection pressure.

In known machines of this kind both the mould-locking force and the injection force are applied by direct action of a hydraulic cylinder, the locking force being transmitted through the injection unit or the injection force through the locking unit; in some cases force transmitted through the injection unit locks the mould halves by its action on a toggle mechanism.

These existing single cylinder machines suffer the disadvantage of lack of independent adjustment of locking and injection forces and that the mould is not fully locked before injection takes place but only when the force from the operating plunger reaches its maximum. In addition when the locking movement is activated through the injection unit special means have to be adopted to prevent spillage of plastic material before the mould faces are shut.

It is an object of the invention to provide a machine in which mould closing and injection take place in ordered sequence with individual adjustment for force applied so overcoming the difficulties experienced with existing machines.

According to the present invention, in a machine of the kind described, a toggle mechanism connected to the moving die platen closes the mould during the initial part of the stroke of the operating piston-and-cylinder unit, cam-means movable by said operating unit being provided to straighten the toggle links for closing the mould and to lock the toggle links in the straight condition during moulding, whereby throughout the moulding, the die platens are not subjected to any greater closing force than that produced by the straightening of the toggles while this force is maintained constant by the toggle "lock" irrespective of variations in hydraulic pressure.

Further movement of the operating cylinder piston is arranged to effect injection at any desired pressure while the cam-means prevent the toggles unlocking.

One form of construction in accordance with the invention will now be described by way of example, reference being had to the accompanying drawings in which:

Figure 1 is a perspective view of the machine with parts broken away to show the detail, Figure 2 is a cross-sectional elevation of the feed and injection ram and the heating and plasticising chamber, Figure 3 is a view in part broken away of the toggle mechanism as seen in a direction parallel to the toggle pivot axes, and Figure 4 is a view in the direction of the arrow 4 of Figure 3.

The machine to be described comprises a base 11 containing the control equipment and the tanks and pump for supplying hydraulic fluid under pressure. At opposite ends of the base are an upstanding thrust plate 12 and fixed platen 13 and these are connected by a pair of fixed parallel tie rods 14 extending longitudinally of the machine. The ends of said rods at the thrust plate and platen are secured to diagonally opposite corners thereof. The other corners of the thrust plate and platen are occupied by two motion rods 15 parallel to the tie rods, and the motion rods pass slidably through bores in the thrust plate and platen and project beyond them at either end. At each end the extremities of the projecting motion rods 15, are united by a yoke 16 or 17.

At the right-hand end of the machine a heating and plasticising chamber 18 for moulding material is disposed centrally between the motion rods 15 with its axis parallel thereto, the chamber lying outside the right hand platen 13 and being supported between said platen and a crosshead casting 19 at the right hand end of the chamber through which the motion rods 15 pass slidingly. The right hand end of said chamber 18 constitutes an injection cylinder 20, as best seen in Figure 2, and the ram rod 21 working in the injection cylinder passes out of the cylinder through the right hand end thereof, and is secured to the yoke 17 that unites the right hand extremities of the motion rods 15. Leftward movement of the motion rods 15 therefore causes the ram 21 to force moulding material through the heating and plasticising chamber 18 also in a leftward direction.

The moulding material, which is normally initially in granular or pellet form, is supplied to the injection ram 21 by a compensating feed arrangement known per se, and comprising a gravity feed hopper 22 and a feed cylinder 23 and ram 24 below it. The hopper 22 and feed cylinder 23 are mounted on the crosshead casting 19 and the feed cylinder, which lies above the injection cylinder 20, operates to deliver a metered quantity of moulding material from the bottom of the hopper to the injection cylinder at each stroke of the injection ram 21. The operation of the feed ram 24 is through a rod 25 connected to the yoke 17 uniting the right hand extremities of the motion rods 15.

Between the thrust plate 12 and the fixed platen 13 a moving platen 26 is mounted to slide along the tie and motion rods 14, 15 and the sliding platen 26 and the right hand fixed platen 13 carry between them the dies of the mould (not shown). Rightward movement of the sliding platen 26 closes the mould, and the moulding material is then forced from the heating and plasticising chamber 18 along delivery passages 27 and through a nozzle 28 within the fixed platen 13 into the mould.

Toggle mechanism 29 connecting anchorages 40, 41 integral respectively with the sliding platen 26 and the thrust plate 12 serves to close and open the mould. There are four sets of toggle links 31, 32 connecting the thrust plate and the sliding platen, as best seen in Figures 3 and 4, the toggle linkages being straight and parallel to the motion rods 15 when the mould is closed and breaking when the mould is opened. The toggle link connections lie at roughly diagonally opposed positions with respect to the platens, just inside the axes of the motion rods 15, and the toggles break in an inward direction toward one another and away from said rods. A diagonal crosshead 30 carrying toggle-operating cam plates 35, 36 extends between and is fixed to, the motion rods 15, and there are two sets of toggle links 31 or 32, near each end of the crosshead 30 one on each side thereof.

The toggle-operating cam plates 35, 36 on the diagonal cross-head 30 are carried one on each side thereof, and each has a symmetrical pair of curved cam slots 37 to engage rollers 38 on the centre pivots 39 of the two sets of toggle links on that same side of the crosshead. The profiles of the two slots of each cam plate lie in a plane parallel to the common plane of the motion rod axes, and extend generally in the direction of length of said rods, but while the slots are spaced well apart from one another at their right hand ends, 33, they converge on one another toward their left hand ends 34. When the toggle linkages are broken inwardly their rollers 38 are in engagement with the convergent left hand ends of the cam slots 37, and as the cams are moved with the crosshead 30 from right to left the diverging profiles force the toggles outwardly until, when the rollers 38 reach the divergent ends 33 of the cam slots and come into contact with outwardly-directed straight faces 42 on the cam plates, the toggles have straightened.

To operate the machine, a single hydraulic piston-and-cylinder unit 43 is mounted centrally on the outside of the thrust plate 12, and extends toward the left with its axis parallel to the motion rods 15. The piston rod 44 thereof emerges from the left hand end of the cylinder and is connected to the yoke 16 which unites the left hand extremities of the motion rods 15.

In operation, pressure fluid is first admitted to the cylinder 43 of the operating unit at a relatively low pressure (of, say, a few hundred pounds) and the motion rods 15 commence to slide to the left as the unit extends. During the initial movement the toggle-operating cams 35, 36 on the crosshead 30, which moves with said rods, effect the straightening of the toggles 31, 32 and the mould is closed; while this is happening the injection ram 21 is idling and is not forcing the moulding material through the heating and plasticising chamber 18. When the toggles have straightened, the machine control equipment operates automatically to increase the cylinder pressure to, say, 2,000 pounds per sq. inch, and injection moulding takes place.

The greatest force applied anywhere in the machine is that given by the toggles to "lock" the press. The actual effort required on the crosshead 30 which operates the toggles to produce this "locking" force, however, is quite small. The injection force has a value between that of the locking force and the crosshead force. In the case of the single cylinder machine considered, for example, these forces are approximately: locking force 10 tons; injection force 5 tons; and the force required on the crosshead to produce the locking force of 10 tons approximately 3 tons.

It will be noted that while moulding is taking place the mould is locked securely in the closed position by the toggles, but at no time can the toggles be provided with an operating force which will enable them to "overlock" the press.

The injection ram 21 is secured to the yoke 17 at the adjacent extremities of the motion rods 15 by having a screw-threaded end 45 (Figure 2) to pass through a bore 46 in the yoke and receive a pair of nuts 47. The injection ram effective stroke may therefore be varied by adjusting the positions of these nuts along said screw-threaded end. Similar provision is made where the tie rods 14 join the right hand fixed platen 13, for the purpose of adjusting the position of said platen on the machine base 11 towards or away from the moving platen 26; said fixed platen is mounted on a slideway on the base for this purpose. This adjustment allows different sized dies to be accommodated.

We claim:

1. In an injection moulding machine the combination of a frame, opposed mould-carrying platens supported by the frame, a thrust-member on the frame behind one of the platens which is movable relatively to the other platen, toggle links connecting the thrust-member and said movable platen, a piston-and-cylinder actuating unit having an actuating element movable in the direction of movement of the platen, cam means connecting said actuating element and said toggle links to operate the toggle links when the actuating element is moved, an injection cylinder-and-ram unit in operative relation to one of the platens, means for feeding moulding material into the injection unit so that said unit may force said material into the mould, and operative connections between said piston-and-cylinder actuating unit and said ram unit to effect injection, the cam means being shaped to close the mould fully before the operative connections to the ram unit effect injection.

2. A machine as claimed in claim 1 wherein the operative connections between the actuating unit and the ram unit comprise motion rods parallel to the line of action of the actuating unit which extend slidably through the platens and the fixed thrust member and are coupled to the actuating unit to be slid longitudinally thereby, and the cam means for operating the toggles is carried by the motion rods between the thrust member and the moving platen.

3. A machine as claimed in claim 2 wherein fixed tie rods along which the moving platen slides, extend between the thrust member and the fixed platen parallel to the motion rods.

4. A machine as claimed in claim 3, wherein there are two motion rods passing through diagonally-opposed corners of the thrust plate and platens which are of substantially square-shape, and the tie rods are also two in number and occupy the remaining two corners.

5. A machine as claimed in claim 2 wherein the operating piston-and-cylinder unit is mounted on the outside of the thrust plate, the motion rods extend out beyond the operating unit, and said unit acts on the motion rods through the intermediary of a yoke connecting the ends of said rods.

6. A machine as claimed in claim 2, wherein a heating and plasticising chamber for the moulding materials is mounted outside of the fixed platen, with the injection ram arranged to act along the line of action of the operating piston-and-cylinder unit and in the direction to force said material through said chamber into the mould during the working stroke, and the motion rods extend out beyond the heating and plasticising chamber and the injection ram and are united at their ends by a yoke to which the injection ram is coupled.

7. A machine as claimed in claim 2, wherein the cam means comprises a crosshead member secured to the motion rods to move therewith and carrying profiled cam plates to act on the toggle links.

8. A machine as claimed in claim 7, wherein the cam plates are formed with profiled cam slots in which are engaged follower rollers carried by the centre laterally-displaceable pivots of the toggle links.

9. A machine as claimed in claim 4, wherein there are a plurality of sets of toggle links symmetrically disposed about a datum plane which contains the axis of the operating unit and is at right angles to the common plane of the motion rod axes, the axes of the toggle pivots being parallel to the datum plane and the toggles on opposite sides of said plane breaking inwardly toward one another and the cam slots which are likewise symmetrical about said datum plane extend generally in the longitudinal direction of the rods and diverge from another along their length so as to produce a straightening action on the toggles as the motion rods slide.

10. A machine as claimed in claim 9, wherein the divergent ends of the cam slots terminate in straight cam edges parallel to the motion rods, which cam edges travel against the follower rollers of the toggles during the mould-injection part of the machine stroke subsequent to the closing of the mould whereby the toggles are kept locked in the straight condition.

11. A machine as claimed in claim 9, wherein there are four sets of toggle links arranged symmetrically about the common plane of the motion rod axes, and the crosshead member carries two cam plates on opposite sides thereof and likewise symmetrically arranged about said plane.

References Cited in the file of this patent
UNITED STATES PATENTS
2,785,439    Gastrow ---------------- Mar. 19, 1957